US006856757B2

(12) United States Patent
Dagtas

(10) Patent No.: US 6,856,757 B2
(45) Date of Patent: Feb. 15, 2005

(54) APPARATUS AND METHOD FOR DETECTING SPORTS HIGHLIGHTS IN A VIDEO PROGRAM

(75) Inventor: Serhan Dagtas, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 897 days.

(21) Appl. No.: 09/815,104

(22) Filed: Mar. 22, 2001

(65) Prior Publication Data

US 2002/0136528 A1 Sep. 26, 2002

(51) Int. Cl.[7] .............................. H04N 5/91; H04N 5/93
(52) U.S. Cl. .............................. 386/68; 386/46; 386/52
(58) Field of Search ............................... 386/68, 67, 69, 386/70, 81, 82, 109, 111, 112, 124, 125, 126, 27, 33, 40–55, 4; H04N 5/91, 5/93

(56) References Cited

U.S. PATENT DOCUMENTS

| | | | | |
|---|---|---|---|---|
| 5,122,886 A | * | 6/1992 | Tanaka | 386/104 |
| 5,126,851 A | * | 6/1992 | Yoshimura et al. | 386/60 |
| 5,179,449 A | | 1/1993 | Doi | 358/311 |
| 5,233,485 A | * | 8/1993 | Yang | 360/72.1 |
| 5,532,833 A | | 7/1996 | Hong et al. | 358/335 |

FOREIGN PATENT DOCUMENTS

JP  09-147472  6/1997
WO  WO 98/23085  5/1998

OTHER PUBLICATIONS

Yi Tong Tse et al.; Global Zoom/Pan Estimation and Compensation for Video Compression; CH2977–7/91/0000–2725; pps. 2725–2728.

Ziad M. Hafed; Object Tracking—Principles and Challenges to Keeping an Eye on Things; IEEE Potentials; Aug./Sep. 1999; pps. 10–13.

Kentaro Matsui et al.; Soccer Image Sequence Computed by a Virtual Camera; 0–8186–8497–6/98 1998 IEEE; pps. 860–865.

* cited by examiner

Primary Examiner—Robert Chevalier

(57) ABSTRACT

A method and system to automatically detect and isolate segments of interest from sports programs is provided. Accordingly, the method includes the steps of: segmenting incoming video programs into a plurality of segments; detecting a slow moving object between the frames; computing the corresponding gravity level of the detected segments representing the slow moving object; and, comparing the computed gravity level to a predetermined threshold. The system includes a segmentation circuit for segmenting each frame of incoming video programs into a plurality of segments, and a motion detection circuit for detecting the slow moving object between successive frames and for determining the gravity level corresponding to the slow moving object.

22 Claims, 6 Drawing Sheets

APPARATUS AND METHOD FOR DETECTING SPORTS HIGHLIGHTS IN A VIDEO PROGRAM

BACKGROUND OF INVENTION

1. Field of Invention

The present invention relates to automatically detecting video segments of interest, and more particularly, to a method and system for automatically isolating and storing segments of interest in a video program.

2. Description of the Related Art

In general, selective documentation of team games, such as football, basketball, soccer, and baseball, is achieved by manually editing the video representations of team games. To this end, video editors are typically used. Currently, there is a wide variety of video editing devices available in the marketplace. They include a video cassette recorder (VCR) that uses magnetic tapes to store video programs and recent digital recorders that use computer magnetic hard disks, such as Replay TV™, TiVO™, and digital versatile disk (DVD). Using these devices, viewers can detect and isolate segments of interest from various sports programs and create a game summary. However, viewers must constantly monitor the sports programs in order to detect interesting events. Thus, the process of editing and sorting various sports programs is time consuming and requires a great deal of human interaction.

Therefore, there is a need for improved systems and methods that are capable of automatically detecting interesting sports events in a stream of video programs and creating a game summary.

SUMMARY OF THE INVENTION

In the preferred embodiment, the present invention is directed to an apparatus and method capable of detecting the slow motion segments from incoming stream of video shows to generate highlights of sports games and replaying them back in real time.

Accordingly, the present invention provides an apparatus for automatically detecting slow-motion highlights from a plurality of incoming video programs and includes: a storage medium for storing the incoming video programs; a recording circuitry for receiving the incoming video programs and storing them in a storage medium; a segmentation circuit for segmenting incoming video program into a plurality of segments; and, a slow motion detection circuit for detecting a slow moving object between successive frames, for determining the gravity level of the slow moving object in the incoming video programs, and for comparing the detected gravity level to a predetermined threshold value.

The present invention provides a method of automatically detecting slow-motion highlights from a plurality of incoming video programs which includes the following operation steps: segmenting incoming video programs into a plurality of segments; detecting a slow moving object between the segments of successive frames of the incoming video programs; determining the corresponding gravity level of the detected segments indicative of slow moving object; and, comparing the determined gravity level to a predetermined threshold value.

The features and advantages of the present invention will become more apparent from the following detailed description considered in conjunction with the accompanying drawings.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments which depart from these specific details. Moreover, for the purpose of clarity, detailed descriptions of well-known devices, circuits, and methods are omitted so as not to obscure the description of the present invention with unnecessary detail.

Figure 1:
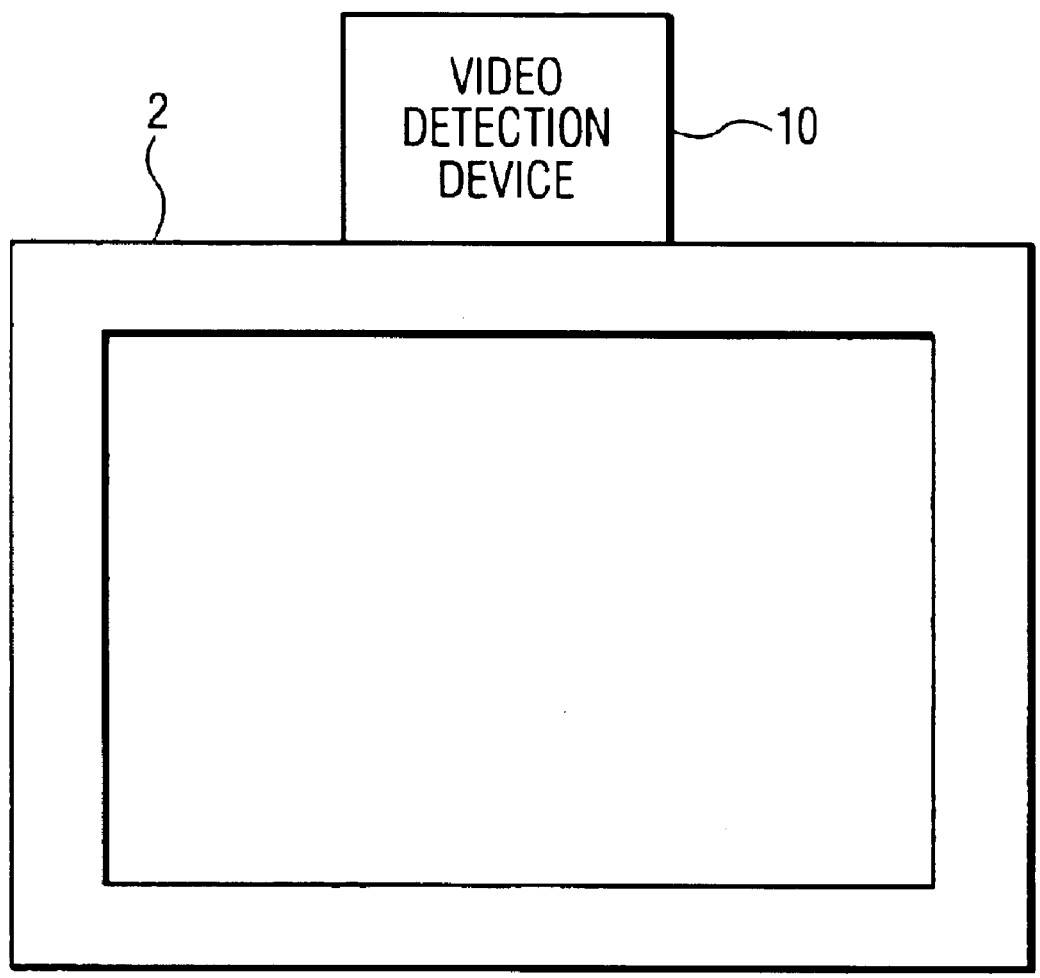
FIG. 1 illustrates an exemplary video detection/recording device and a television set according to an embodiment of the present invention.

FIG. 1 illustrates an exemplary video detection/recording device 10 and a television set 2 according to the embodiment of the present invention. The video detection/recording device 10 is adapted to receive a stream of video signals from a variety of sources, including cable service provider, digital high definition television (HDTV) and/or digital standard definition television (SDTV) signals, a satellite dish, a conventional RF broadcast, an Internet connection, or another storage devices, such as a VHS player or DVD player. According to the embodiment of the present invention, the video detection/recording device 10 detects the incoming video signals (i.e., sports programs) for any slow-motion frames and stores a summary of slow-motion segments in a storage medium within or connected to the video detection/recording device 10. During a play mode, the video detection/recording device 10 retrieves the stored summary of the sports highlights from the storage medium and replays it at normal speed via the television set 2.

Figure 2:
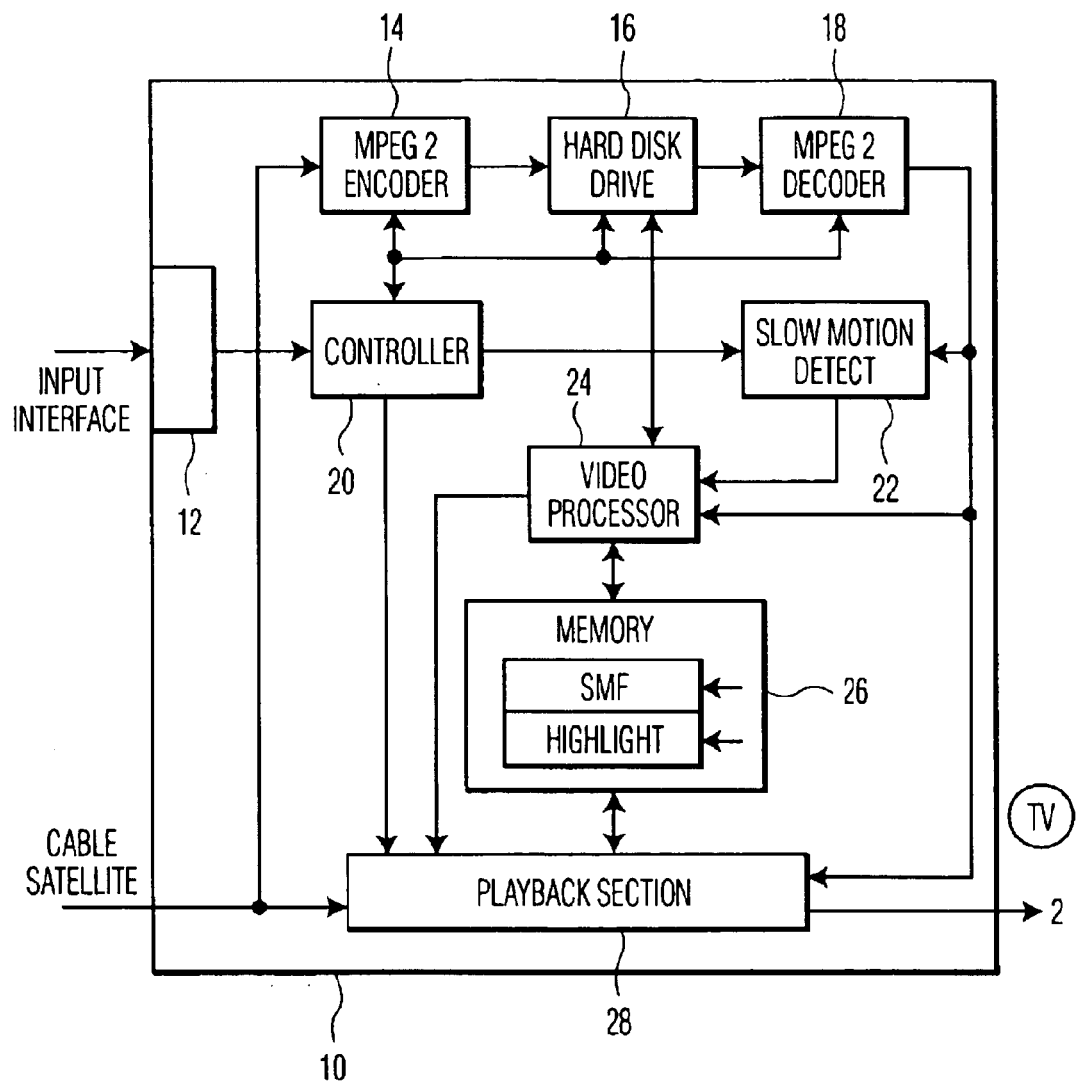
FIG. 2 illustrates a simplified block diagram of the detection device according to an embodiment of the present invention.

FIG. 2 illustrates an exemplary video detection/recording device 10 in greater detail according to the embodiment of the present invention. The detection device 10 includes an input interface (i.e., IR sensor) 12, MPEG-2 encoder 14, hard disk drive 16, MPEG-2 decoder, controller 20, slow motion detector 22, video processor 24, and memory 26, and playback section 28. It should be noted that MPEG encoder/decoder may comply with other MPEG standards, i.e., MPEG-1, MPEG-2, MPEG-4, and MPEG-7. The controller 20 overseas the overall operation of the detection device 10, including a detection mode, record mode, play mode, and other modes that are common in a video recorder/player.

During a normal recording mode, the controller 20 causes the MPEG-2 encoder 14 to receive incoming television signals delivered from satellite, cable, wire, and television broadcasts or the web and converts the received TV signals to MPEG format for storage on the hard disk driver 16. During a normal playing mode, the controller 20 causes the hard disk driver 16 to stream the stored television signals to MPEG-2 decoder, which in turn transmits the decoded TV signals to be transmitted to the television set 2 via the play back section 28.

During a normal viewing mode, the controller 20 causes the incoming television signals to be demodulated and processed by the video processor 24 and transmits them to television set 2. Here, the incoming TV signals are not stored or retrieved from the hard disk driver 16. The video processor 24 converts the incoming TV signals to corresponding baseband television signals suitable for display on the television set 2. According to the principle of the present invention, the detection device 10 further provides a means for compiling selected highlights from a stream of video information representing sports games as described in greater detail below.

Typically, highlights or important portions of a sports game are shown in slow motion, thus the slow-motion portion of the programs constitutes an important clue in generating a summary of game highlights. The present invention utilizes this feature in the sports programs to isolate the corresponding slow-motion segments and independently store them in a storage medium for subsequent viewing purposes. Additionally, the present invention computes a slow-motion factor, which is used to reverse the slow motion effect of the recorded segments in the subsequent playback mode.

Figure 3:
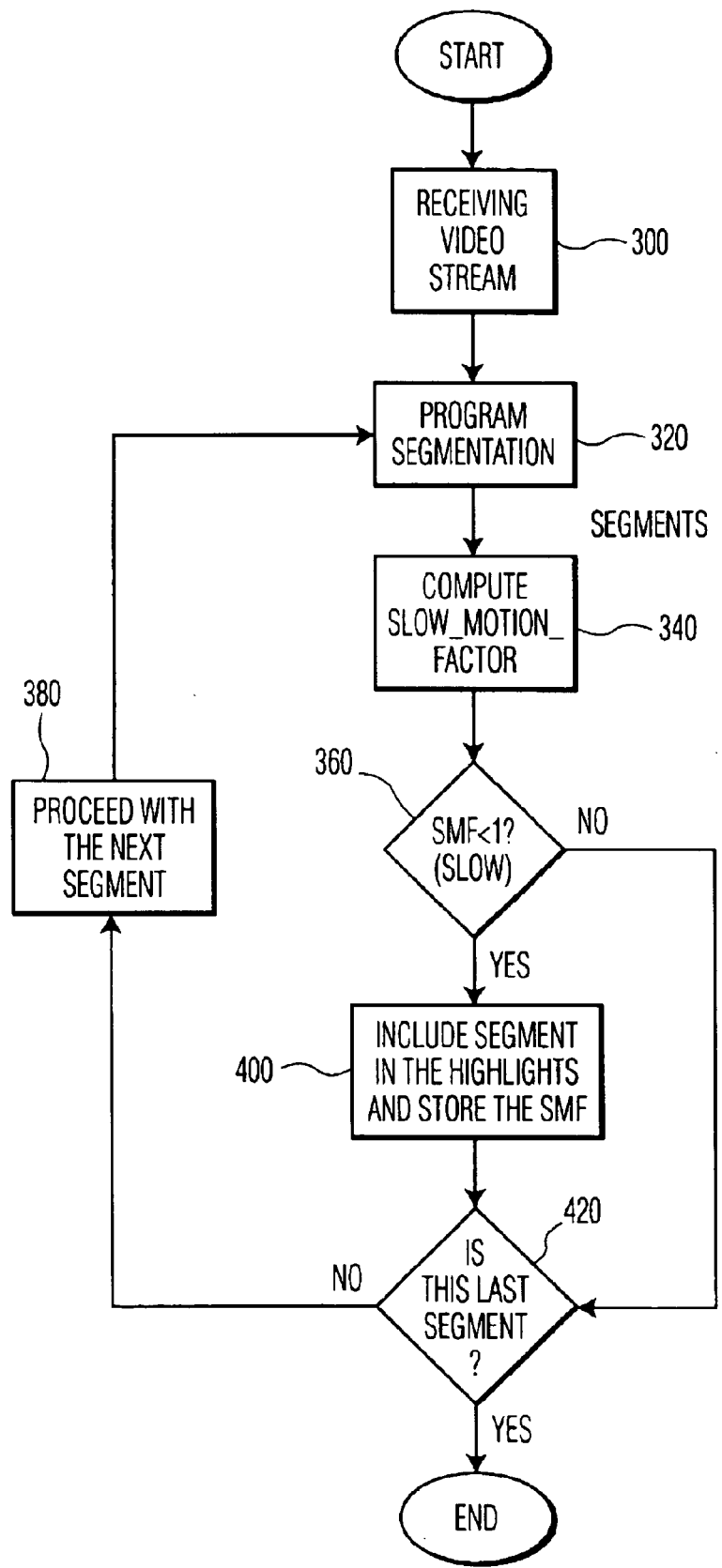
FIG. 3 is a flow diagram illustrating the operation of the detection device according to an embodiment of the present invention.
Figure 4:
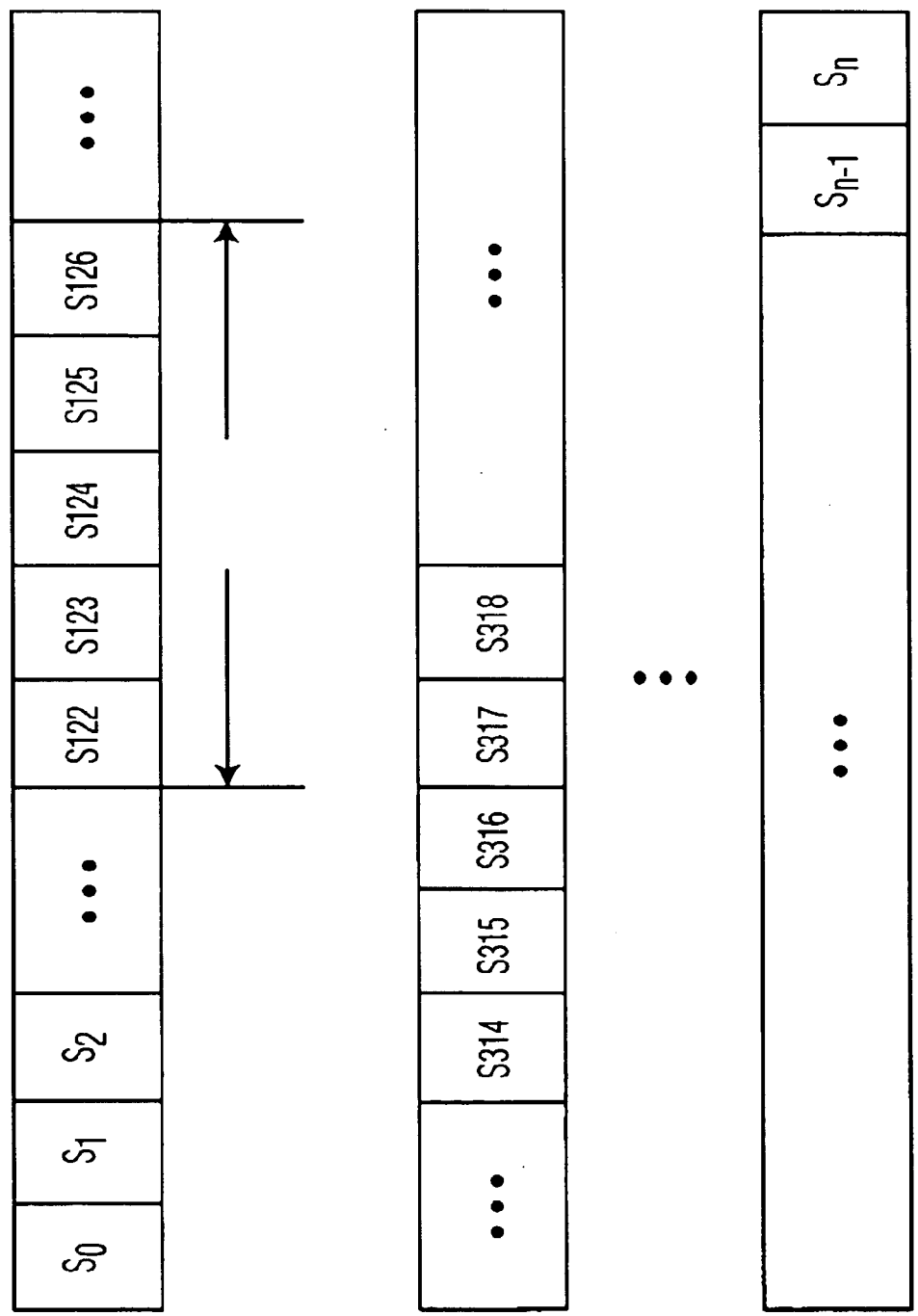
FIG. 4 illustrates segmentation of a video program according to an embodiment of the present invention.

FIG. 3 depicts the operation steps related to the detection and storage of the slow-motion segments from a variety of sports shows. Referring to FIG. 3, if the user has activated the detection/recordation device 10 to detect slow-motion highlights from the incoming video programs, the controller 20 causes the slow motion detector 22 to detect a series of slow-motion segments from the incoming television signals. In step 300, the controller 20 causes the video processor 24 to process the incoming television signals comprised of successive frames. A "frame" is a picture, and each segment contains a plurality of frames. Each "segment" is a group of frames and may consist of frames between camera breaks. In the embodiment of the present invention, the video processor 24 segments the incoming television signals into a plurality of segments in step 320. FIG. 4 depicts the format of incoming TV signals, which comprises a plurality of sequential segments, $S_0$ through $S_n$. Video program segmentation is a well known in the art that can be performed in a variety of ways. See for example, U.S. patent Pat. Ser. No. 5,179,449, entitled, Scene Boundary Detecting Apparatus, filed on Jan. 12, 1993.

In step 340, each segment is analyzed by the slow motion detector 22 to determine whether a particular segment being examined is a slow or regular motion segment. This determination is achieved by computing the effective gravity (explained later in conjunction with FIGS. 5 and 6) according to the embodiment of the present invention. That is, the frames within each segment are examined to determine whether a particular segment being examined is a slow or regular motion segment. Effective gravity is also used in the next step to determine the slow_motion_factor (SMF) in step 360 (explained later in conjunction with FIGS. 5 and 6). The SMF indicates the degree of slowness in the detected slow-motion frames. For example, if the degree of slowness factor is determined to be, 0.25, it represents that the detected slow-motion frames are broadcast four times slower than actual speed. However, if the SMF is less than the threshold value in step 360, that segment is included in the memory 26 along with the computed SMF in step 400. Thereafter, it is determined whether a particular segment being examined is the last segment in step 420. If it is not the last segment, the operation returns to step 380. In this manner, the computation of SMF for all segments can be performed.

Thereafter, in the play mode, the controller 20 causes the playback section 28 to retrieve the highlights summary stored in the memory 26 and forward the summary to television set 2. At this time, if the viewer requests to replay the highlights summary at a normal speed via the input interface 12, the controller 20 directs the playback section 28 to retrieve the corresponding slow motion factor (SMF) stored in the memory. Then, to reverse the effect of slow motion, the playback section 28 can play the selected highlights in real time speed by sub-sampling the frames according to the SMF (i.e., playing one every $(SMF)^{-1}$ frame).

Now, a detailed description of the inventive steps in determining whether a particular segment of a program is broadcast in slow motion and the degree of the slowness to play them back in real-time speed is explained hereinafter.

Figure 5:
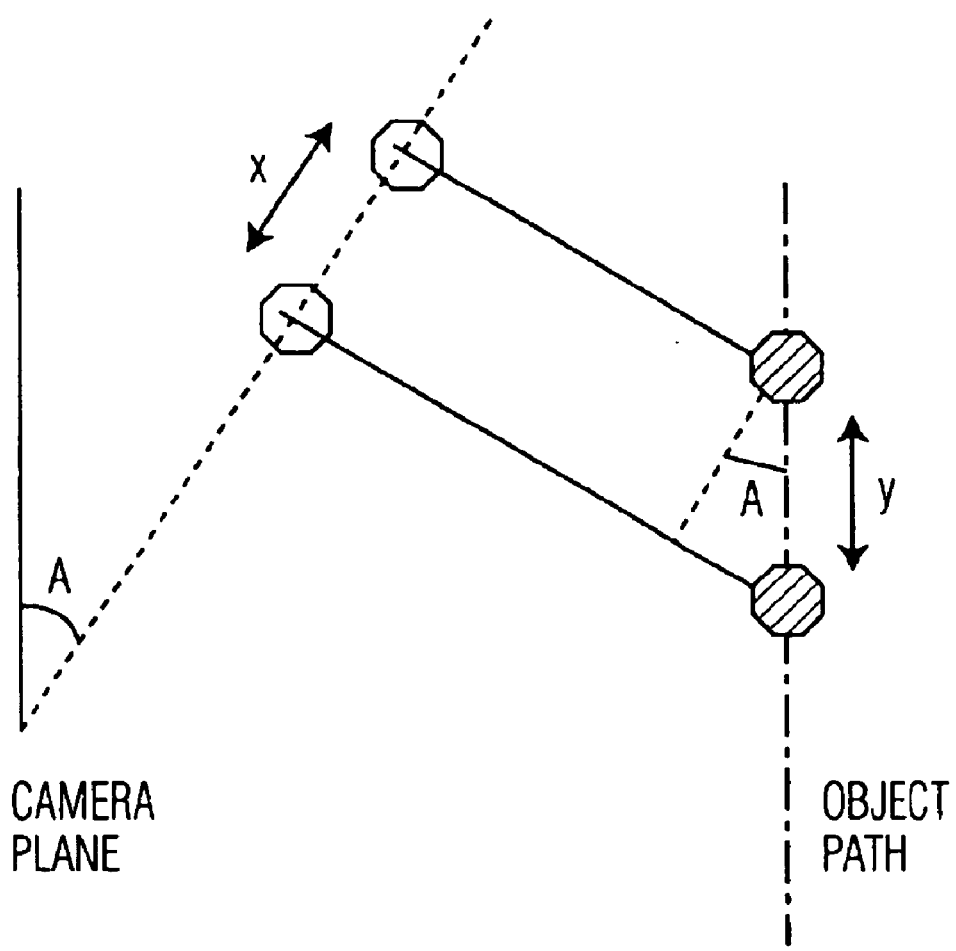
FIG. 5 is a diagram illustrating the principle of the present invention.

Under the principle of gravity, all falling objects exhibit the same vertical acceleration as the gravity of earth. As most sports programs involve a ball of known shape and size, the present invention utilizes the motion of the ball in a given program to determine whether a particular segment is a slow motion segment by comparing to the actual gravity of the earth. FIG. 5 illustrates the free fall situation of a ball, whose image is projected on the screen where it moves x units from one frame in the video sequence to the next. The distance on camera plane (TV screen), x, is determined according to the present invention, then the actual vertical distance, y, is derived to compute the corresponding velocity of the moving ball. Using trigonometry, the gravity of a moving object can be computed and compared to the earth gravity to determine the slow motion factor.

Figure 6:
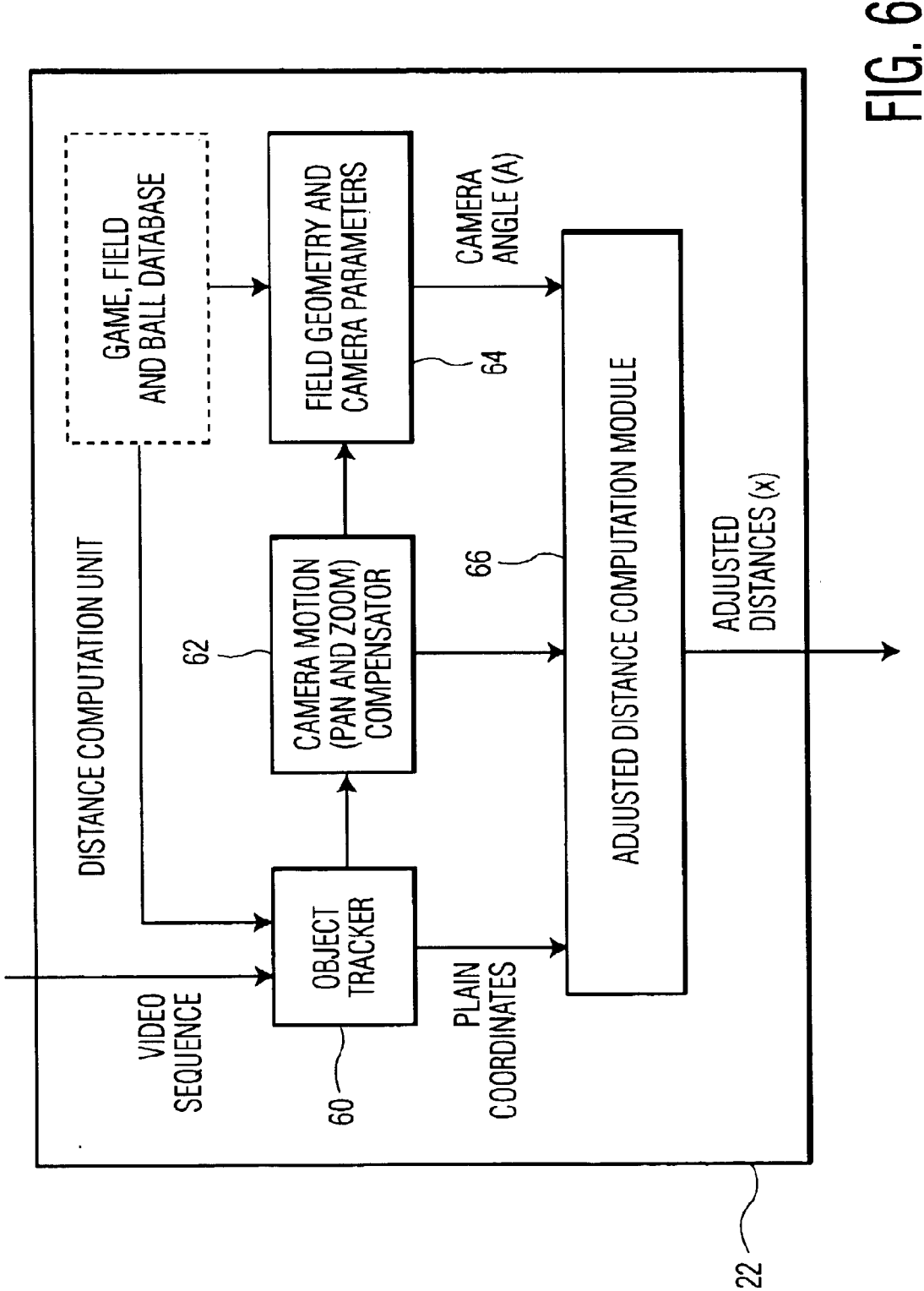
FIG. 6 is a simplified block diagram of the slow motion detection circuit according to an embodiment of the present invention.

FIG. 6 illustrates the components of an exemplary circuit that computes the correct x value, as described in the preceding paragraphs, in an actual video environment. This distance computation circuit is located in the slow motion detection circuit 22 of FIG. 2. As shown in FIG. 6, the video sequence images are first run through an object tracking module 60, which determines the plain screen coordinates of the moving ball between frames. Here, the progress of certain features of objects, i.e., basketball, baseball, football, etc., as they move about in a visual scene is selected and traced. These features are matched over different frames to track the coordinates of the moving objects. Hence, the object tracker 60 performs spatio-temporal segmentation of image sequences to trace the location coordinates of moving objects in a stationary visual field. The selected object feature is matched in successive frames to describe its motion in the image plane and to obtain coordinates of moving object. The algorithm for detecting plain screen coordinates of moving object is well known in the art that can be performed in a variety of ways. See for example, Object tracking, by Hefed, Z. M., IEEE Potentials, page 10–13, Vol. 18, 1999, the content of which is hereby incorporated by reference. These coordinates, however, are not sufficient to determine an accurate x as these coordinates fail to accurately model other sources of temporal changes, such as camera zooms and pans.

Basically, a zoom is caused by a change of the camera's focal length, whereas pan is caused by the camera's rotation about an axis parallel to the image plane. Thus, they both affect the image-space coordinates detected by the object tracker 60. To this end, a camera motion compensator 62 is provided, as shown in FIG. 6, to estimate and compensate camera effects. Compensating the moving camera effects is well known in the art that can be performed in a variety of ways. See for example, Global zoom/pan estimation and compensation for video compression, by Yi Tong Tse and Richard L. Baker, Acoustics, Speech, and Signal Processing, IEEE 1991, the content of which is hereby incorporated by reference.

Referring to FIG. 5, in order to compute y from x, the angle of the camera plane is determined. As TV images are a 2D projection of a 3D scene and often lack the images in reality, the camera parameters of the images is determined and transformed into more real coordinates. Then, the angle detector 64 using the detected moving object calculates corresponding real world coordinate system to generate accurate camera angle. To achieve this, an angle detector 64 is provided to compute the camera angle, A, using a database of fields for a particular game and camera. See for example, Soccer image sequence computed by a virtual camera, by Matsui, K, et. al, Computer Vision and Pattern Recognition, IEEE 1998, the content of which is hereby incorporated by reference.

All of the information including the plain coordinates, compensated coordinates, and camera angle relative to the moving objects is fed into the adjusted distance computation module 66, which combines all this information and computes the adjusted (compensated) distance values, x, for use according to the principle of the present invention. Once the angle and adjusted x value are determined, the value y can be computed as follows: y=x/Cos (A), where Cos is the standard trigonometric function, cosine.

Using the above technique, y values are computed for each pair of consecutive frames over a segment of N frames, thus obtains N−1 such values; namely $y_i$, i=1, . . . , N−1. Using these $y_i$ values, it is possible to compute the N−2 velocity values as $v_i=(y_i-y_{i-1})/t$, i=2, . . . ,N−1, where t is the time interval between two frames. Thus, for a sequence recorded at 30 frames per second, t would equal 1/30 sec. Therefore, it is possible to compute the measure acceleration as follows:

Effective_Gravity$_i$=$(v_i-v_{i-1})$/t, i=3, . . . , N−1.

Furthermore, in order to improve accuracy, the measurement can be smoothed out for a given segment by taking the average as follows:

Effective_Gravity=Average(Effective_Gravity$_i$)i=3, . . . , N−1.

In the embodiment of the present invention, any effective gravity value less than the actual gravity of Earth will indicate that the segment is actually in slow motion and therefore included in the "highlights" collection. Thus, the slow motion actor can be computed as follows:

Slow_Motion_Factor=Effective_Gravity/Earth_Gravity.

Finally, once the SMF is obtained for the detected slow motion highlights, the present invention allows a playback of the slow motion highlights by subsampling the frames by a factor equal to the SMF in order to reverse the effect of slow motion. Hence, the detected slow motion highlights can be viewed in real time speed. Accordingly, the present invention can be used in a variety of applications, such as video browsing, home video library systems to 1) display the highlights from the real TV program and produce abstract program summaries; 2) browse through video program summaries; or 3) fast access to the highlighted segment in recorded video.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for automatically detecting slow-motion highlights in a plurality of incoming video programs, comprising:

a segmentation circuit for segmenting said video programs into a plurality of segments; and, a motion detection circuit for detecting a slow moving object between successive frames in said video programs, for determining a gravity level of said slow moving object in said video programs, and for comparing said detected gravity level to a predetermined threshold value.

2. The apparatus of claim 1, further comprising a storage medium for storing said segments indicative of said slow moving object in said video programs.

3. The apparatus of claim 1, further comprising a playback circuit capable of playing back said segments indicative of said slow moving object in said video programs in real time speed.

4. The apparatus of claim 1, wherein said motion detection circuit further determines the degree of slowness in said segments indicative of said slow moving object.

5. The apparatus of claim 1, wherein said motion detection circuit stores said segments indicative of said slow moving object in response to a determination that said detected gravity level is lower than said predetermined threshold value.

6. The apparatus of claim 1, wherein said motion detection circuit comprises an object tracking circuit for determining the plain coordinates of said slow moving object between said successive frames of said video programs to obtain a distance traveled by said slow moving object; a compensator circuit for compensating camera motion associated with said plain coordinates; and, a camera angle circuit for determining the angle of said slow moving objects relative to a direction of earth gravity, wherein the distance traveled by said slow moving object is calculated according to the output of said object tracking circuit, said compensator circuit, and said camera circuit.

7. The apparatus of claim 6, wherein the gravity level of said moving object is calculated according to the distance traveled by said moving object and a time duration of said slow successive frames representing the image of said slow moving object.

8. The apparatus of claim 1, wherein said slow motion detection circuit comprises a video processor capable of identifying said segments indicative of said slow moving object between said successive frames of said video programs and further capable of storing said identified segments in said storage medium.

9. An apparatus for automatically detecting slow-motion highlights in a plurality of incoming video programs, comprising:

a storage medium for storing the plurality of said video programs;

a recording circuitry for receiving the plurality of said video programs and storing said video programs in said storage medium;

a segmentation circuit for segmenting said video programs into a plurality of segments; and, a slow motion detection circuit for detecting a slow moving object between successive frames in said video programs, for determining the gravity level of said slow moving object in said video program, and for comparing said detected gravity level to a predetermined threshold value.

10. The apparatus of claim 9, further comprising a playback circuit capable of playing back said segments indicative of said slow moving object in said video programs in real time speed.

11. The apparatus of claim 9, wherein said motion detection circuit further determines the degree of slowness in said segments indicative of said slow moving object.

12. The apparatus of claim 9, wherein said motion detection circuit stores said segments indicative of said slow moving object in response to a determination that said detected gravity level is lower than said predetermined threshold value.

13. The apparatus of claim 9, wherein said motion detection circuit comprises an object tracking circuit for determining the plain coordinates of said slow moving object between said successive frames of said video programs to obtain a distance traveled by said slow moving object; a compensator circuit for compensating a camera motion associated with said plain coordinates; and, a camera angle circuit for determining the angle of said slow moving objects relative to a direction of earth gravity, wherein the distance traveled by said slow moving object is calculated according to the output of said object tracking circuit, said compensator circuit, and said camera circuit.

14. The apparatus of claim 13, wherein the gravity level of said moving object is calculated according to said final distance traveled by said moving object and a time duration of said slow successive frames representing the image of said slow moving object.

15. The apparatus of claim 9, wherein said slow motion detection circuit comprises a video processor capable of identifying said segments indicative of said slow moving object between said successive frames of said video programs and further capable of storing said identified segments in said storage medium.

16. A method for automatically detecting slow-motion highlights in a plurality of incoming video programs, comprising:

segmenting incoming video programs into a plurality of segments;

detecting a slow moving object between successive frames of said incoming video programs;

determining the corresponding gravity level of said detected segments indicative of said slow moving object; and, comparing said determined gravity level to a predetermined threshold value.

17. The method of claim 16, further comprising the step of storing said detected segments indicative of said slow moving object in a storage medium in response to a determination that said determined gravity level is less than said predetermined threshold value.

18. The method of claim 17, further comprising the steps of retrieving said detected segments indicative of said slow moving object from said storage medium and playing back in real time speed.

19. The method of claim 18, further comprising the step of computing the degree of slowness factor of the corresponding said detected segments indicative of said low moving object.

20. The method of claim 19, further comprising the steps of retrieving said detected segments indicative of said slow moving object from said storage medium and playing back in real time speed by reversing the corresponding said computed degree of slowness.

21. The method of claim 16, wherein said step of detecting said slow moving object comprises the steps of:

determining plain coordinates of said slow moving object between said successive frames to obtain a distance traveled by said slow moving object;

compensating for a camera motion associated with said plain coordinates;

determining an angle of a camera plane relative to a direction of earth gravity; and, calculating the distance traveled by said slow moving object according to said compensated plain coordinates and said determined angle.

22. The method of claim 21, wherein the gravity level of said moving object is determined according to the distance traveled by said moving object and the time duration of said slow successive frames representing the image of said slow moving object.

* * * * *